Inventors
James F. Zievers
Clay W. Riley
Richard W. Crain
by: Fidler, Bradley & Patnaude
Att'ys

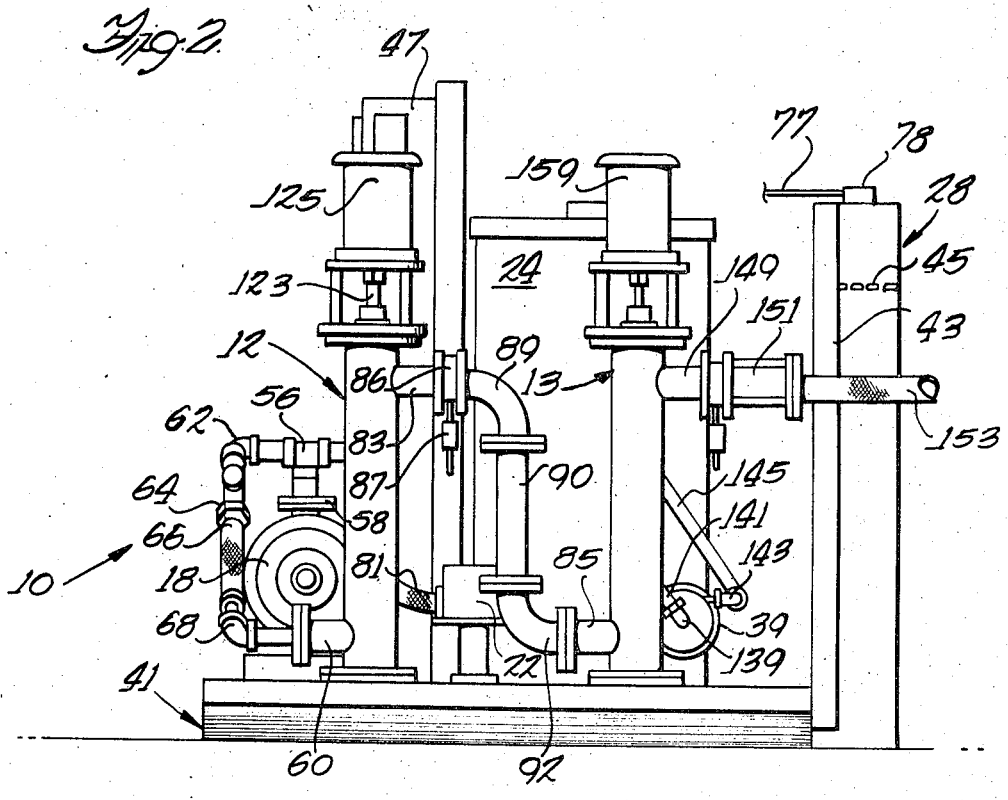
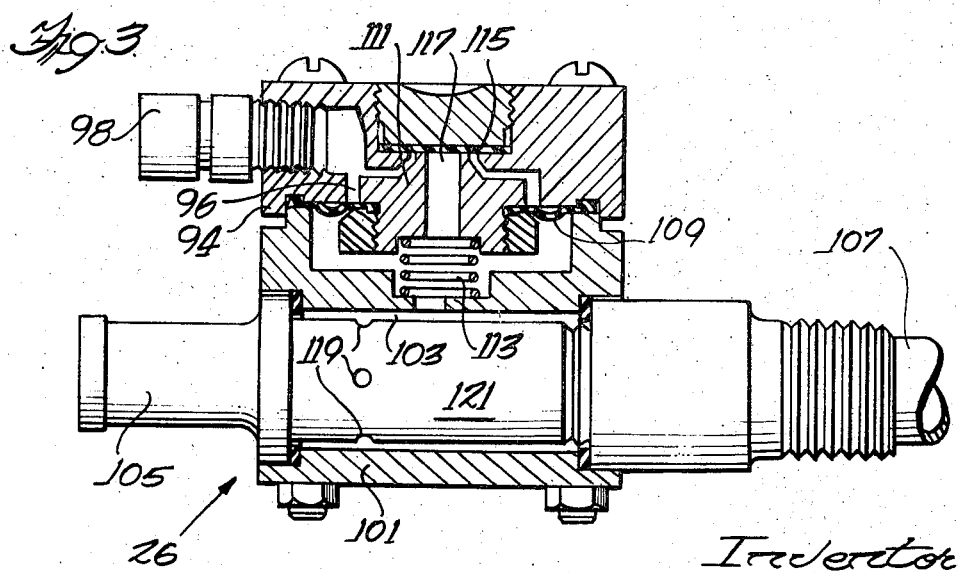

United States Patent Office 3,531,405
Patented Sept. 29, 1970

3,531,405
METHOD AND APPARATUS FOR
TREATING WASTE
James F. Zievers, Clay W. Riley, and Richard W. Crain,
La Grange, Ill., assignors to Industrial Filter & Pump
Mfg. Co., Cicero, Ill., a corporation of Illinois
Filed Apr. 3, 1968, Ser. No. 723,347
Int. Cl. C02b 1/36
U.S. Cl. 210—60
9 Claims

ABSTRACT OF THE DISCLOSURE

A system for treating waste rinses from metal finishing includes a plurality of vertically-spaced, motor-driven impellers in a vertical mixing chamber and a sump pump for discharging continuously a portion of the waste liquid to be treated into one inlet of the mixing chamber and for discharging continuously the remaining portion of the waste into another inlet of the chamber near one of the impellers via an eductor which continuously pre-mixes a treating chemical, which may be toxic or corrosive, with the waste liquid by diffusing the treating chemical into the waste liquid flowing through the eductor so that the toxic or corrosive chemical does not enter the chamber in the absence of waste liquid.

BACKGROUND OF THE INVENTION

This invention relates in general to a method and apparatus for treating waste, and it more particularly relates to a waste treatment system for the safe and economic treatment of metal finishing waste, such as cyanide bearing rinses and chrome bearing wastes.

When using conventional retention tanks for waste chemical treatment, such tanks are large in size, thus requiring a substantial amount of space and also requiring an undue amount of time for processing and treating the waste. In an attempt to overcome these disadvantages, one successful system has employed a sump pump for discharging continuously the waste to be treated into a mixing chamber having a plurality of motor-driven impellers. The treating chemicals were ejected into the vortex of the swirling waste fluid near the impellers, and thence the treated waste was conveyed directly to the sewage system; or alternatively, where required by local restrictions, the treated waste was conveyed from the mixing chamber to a second stage for further treatment. Such a system is disclosed in United States Pat. 3,391,789 entitled "Waste Treatment and Method and Apparatus Therefor." This prior art system, as well as the system of the present invention, is well suited for treating waste, such as the reduction of highly toxic hexavalent chromium to the trivalent state by the addition of sulfur dioxide as the reductant in a sulfuric acid solution, or the destruction of cyanide rinse waters by partial oxidation to the cyanate state (acceptable in some areas depending upon the local governmental regulation) or complete destruction to the carbonaceous and nitrogenous end products. For safety purposes, however, it would be desirable to have a means for insuring that the highly toxic or noxious chemicals, such as the chlorine gas and the sulfur dioxide gas, are thoroughly mixed in the mixing chamber of such a system and do not escape from the outlet of the mixing chamber into the sewage system without first reacting with the waste liquid.

SUMMARY OF THE INVENTION

Therefore, it is the principal object of the present invention to provide a new and improved method and apparatus for treating waste material.

Another object of the present invention is to provide a waste treating system which does not add toxic treating chemicals directly to the mixing chamber so that the toxic chemicals do not have an opportunity to pass through the sysetm into the sanitary or storm sewer without first reacting with the waste matter.

A further object of the present invention is to provide a more efficient and economical, continuous acting waste treatment system.

Very briefly, the above and further objects are realized in accordance with the present invention by providing a method and apparatus for pre-mixing continuously the toxic treating chemicals with waste fluid by means of an aductor, prior to ejecting the toxic chemicals into the mixing chamber.

BRIEF DESCRIPTION OF THE DRAWINGS

The invention, both as to its organization and method of operation, together with further objects and advantages thereof will best be understood by references to the following detailed description taken in connection with the accompanying drawings, wherein:

FIG. 2 is a view in elevation of the two-stage apparatus of FIG. 1; and

FIG. 3 is a vertical cross-sectional view of an eductor unit for pre-mixing a treating chemical with waste liquid before ejecting the treating chemical into the mixing chamber.

DESCRIPTION OF THE PREFERRED EMBODIMENTS

Figure 1:
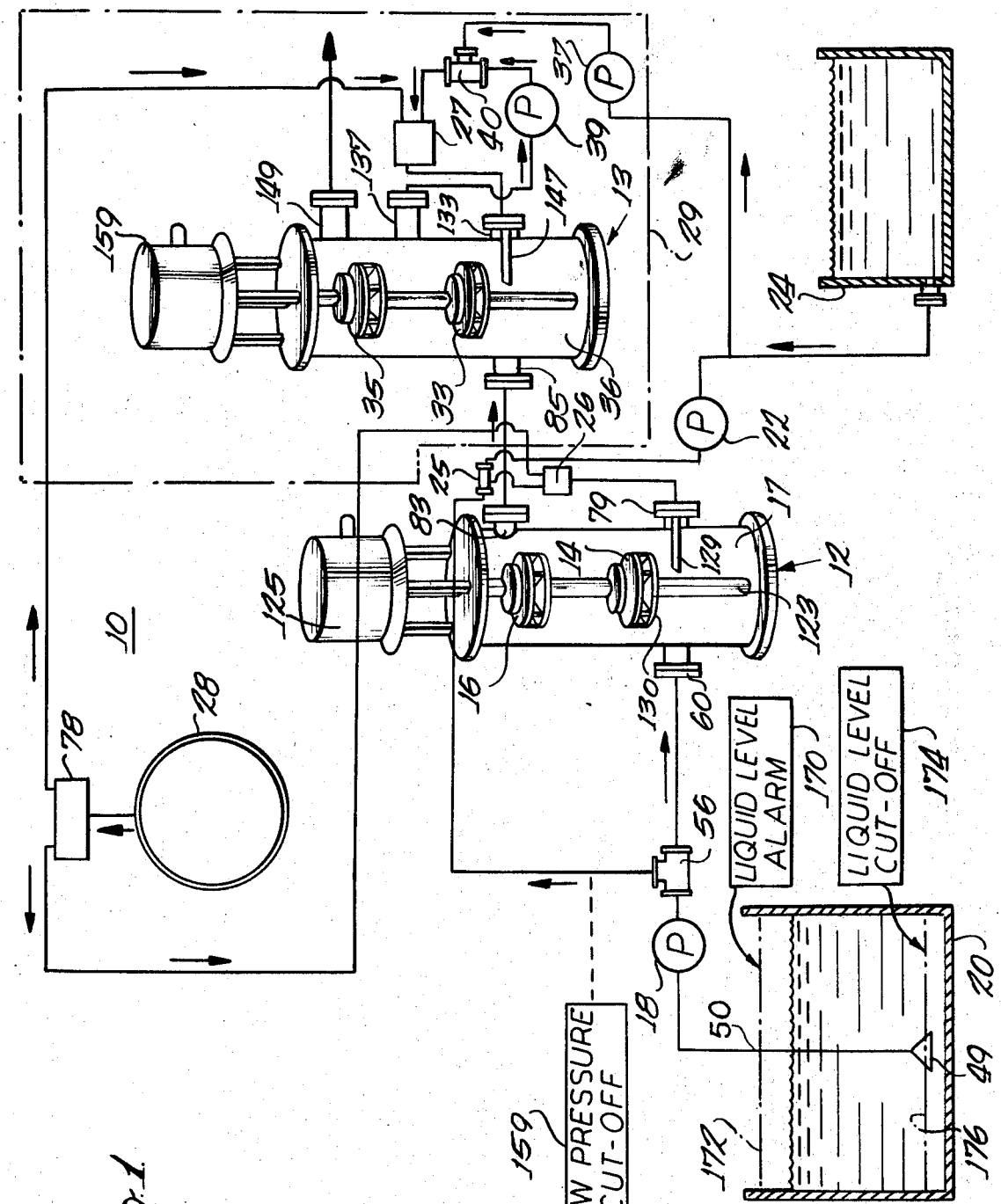
FIG. 1 is a schematic diagram of a two-stage compact unit for the treatment of wastes in accordance with the present invention.

Referring now to the drawings and more particularly to FIGS. 1-3 thereof, there is shown a waste treating apparatus 10 which is a two-stage apparatus for use in a cyanide waste treatment system. While the invention is particularly described for treating cyanide bearing waste, it is to be understood that this apparatus may be used for treating other waste, such, for example, as a chrome bearing waste. It is also to be understood that where local restrictions permit, apparatus of the present invention may be employed as a single stage apparatus using only the first stage of the herein-described apparatus and coupling the output of the first stage directly to the sewage system.

As shown, the waste treating apparatus 10 comprises a first additive and mixing stage including a tower 12 which is operatively connected in a series with a second mixing stage including a tower 13 for further treatment of the waste. The first stage including the mixing tower 12 has a pair of motor-driven vertically-spaced impellers 14 and 16 disposed within a vertical mixing chamber 17, a waste sump pump 18 for pumping the waste liquid (in the present example, an aqueous solution of metallic cyanides) from a sump 20, a caustic pump 22 pumping sodium hydroxide from a caustic tank 24 to add sodium hydroxide to the waste fluid from the sump pump 18 by means of a T connection 25 and an eductor unit 26 for pre-mixing chlorine gas from a conventional chlorine cylinder or tank 28 with the sodium hydroxide and the waste liquid under pressure and for ejecting the pre-mixed chlorine and sodium hydroxide into the mixing tower 12 to oxidize the cyanide to form a cyanate. The cyanate bearing liquid is transferred to the second stage (designated by the broken line 29 in FIG. 1) which includes the second tower 13 having a pair of motor-driven, vertically-spaced impellers 33 and 35 disposed within its vertical mixing chamber 36, and another eductor unit 27 for pre-mixing the chlorine gas from the tank 28 with the cyanate from the first stage and with sodium hydroxide from the caustic tank 24 via a second-stage caustic pump 37 to eject the pre-mixed chlorine and sodium hydroxide into the mixing tower 13. The treated waste liquid containing nitrogen, carbon dioxide, water and other non-toxic chemicals may be directly emptied from the mixing tower 13 into a sanitary or storm sewage system.

In operation, the waste sump pump 18 pumps the waste liquid from the sump 20 into the bottom of the mixing chamber 17 near the lower rotating impeller 14 to accelerate the waste liquid into a vortical whirl. At the same time, the caustic pump 22 pumps sodium hydroxide from the caustic tank 24 to add sodium hydroxide to the waste fluid entering the eductor unit 26 to raise the pH of the solution entering the eductor 26 to a value of 10.0 or higher. Chlorine gas then mixes with the high pH solution in the eductor unit 26 which causes the resulting pre-mixture to enter the mixing chamber 17 at the center of the vortex to mix with the vortically whirling waste fluid. Some of this resulting mixture is continuously forced upwardly around the rotating impeller 14 and thence moves at a relatively slower velocity than the velocity of the liquid in the vortex into contact with the upper rotating impeller 16 to cause a second vortical whirl. Since the unit 26 allows the chlorine to flow only when a vacuum is caused by the liquid flowing through the unit, the chlorine gas does not leave the unit 26 unless and until the waste liquid containing sodium hydroxide begins to flow through the unit 26.

Upon pre-mixing the chlorine gas with the sodium hydroxide and the waste liquid, unit 26 causes the pre-mixture to be ejected into the mixing chamber 17 to mix with and to oxidize the cyanides in the waste liquid, thereby converting the cyanides to cyanates.

The thusly treated waste liquid including the cyanates is then conveyed from the first stage mixing tower 12 to the second stage mixing tower 13 for further treatment. This liquid enters the bottom of the second stage tower 13 below the lower impeller 33 whereby the cyanate bearing liquid contacts the rotating impeller 33 to cause the liquid to enter a vortical whirl. A portion of the cyanate bearing liquid is continuously forced upwardly around the impeller 33 at a relatively slower velocity than the velocity of the liquid in the vortex. The upwardly moving liquid then is caused to enter a second vortical whirl by the upper impeller 35. At the same time, a portion of the cyanate bearing liquid is pumped from the mixing tower 13 at the upper portion thereof to a T connection 40 by means of an ejector pump 39. Sodium hydroxide is pumped from the tank 24 by the caustic pump 37 to the T connection 40 to add sodium hydroxide to the fluid being pumped from the chamber 36 by the pump 39. The outlet of the T connection 40 is connected to an eductor unit 27 coupled to the tower 13. The unit 27 pre-mixes chlorine gas from the chlorine tank 28 with the waste liquid containing sodium hydroxide and causes the pre-mixed chlorine-sodium hydroxide-cyanate liquid to be ejected into the mixing tower 13 at the location of the lower vortex. Because the eductor unit 27 enables the chlorine under pressure to enter the waste liquid containing sodium hydroxide in response to the liquid flowing through the unit 27, the chlorine gas is not ejected into the mixing chamber 36 of the tower 13 unless and until the liquid is flowing through the unit 27. Upon entering the first vortex, the chlorine-cyanate mixture is thoroughly mixed with the vortically whirling liquid for the purpose of causing the cyanates to react with the chlorine to form the non-toxic elements of nitrogen, carbon dioxide and water. The resultant solution may then be transferred from the second stage mixing tower 13 directly into a storm or sanitary sewage system.

Considering now the waste treating apparatus in greater detail and with reference to the accompanying drawings, with particular reference to FIGS. 1 and 2, the waste treating apparatus 10 is mounted on a skid 41 to form a compact unit. The chlorine tank 28 rests on the floor and is detachably connected to the skid 41 by means of a vertically disposed, channel-shaped support bracket 43 having a chain 45 (FIG. 2) wrapped about the tank 28. A control panel 47 is also mounted on the same skid 41 for housing control devices for controlling the motors and other components of the waste treating system. In regard to the first stage of the two-stage treating apparatus 10, a foot valve strainer 49 (FIG. 1) is positioned in the collection sump 20 to strain and convey the waste to the sump pump 18 via a hose 50. The pump 18 is driven by an electric motor (not shown) which is operatively connected to the pump 18 and electrically controlled by the control panel 47. In order to pump the waste fluid to both the mixing tower 12 and the eductor unit 26, a T connection 56 is connected to an outlet 58 of the pump 18. The T connection 56 is coupled to the lower inlet 60 of the mixing tower 12 by an L connection 62, a ball cock valve 64 for controlling the rate of flow of liquid to the mixing tower 12, a hose 66, and an L connection 68. The T 56 is also coupled to the T connection 25 which is connected to the eductor unit 26 which in turn is coupled to the lower inlet 79 of the tower 12.

The chlorine gas for the cyanide destruction, or the sulfur dioxide gas for the chrome destruction system, is coupled from the tank 28 to the eductor unit 26 by means of a hose 77 connected to a conventional chlorinator 78 mounted on top of the chlorine cylinder 28. The caustic (NaOH) for the cyanide destruction system, or sulfuric acid for the chromium destruction system, is pumped from the vessel 24 to the T connection 25 via a hose 81 to mix with the waste fluid being pumped from the sump 20. The outlet of the T connection 25 is connected to the eductor unit 26 which is connected to the lower inlet 79 (FIG. 1) of the tower 12 disposed behind it (FIG. 2) and at about the same height above the skid 41 as the inlet 60. An outlet 83 at the upper portion of the tower 12 is coupled to the lower inlet 85 of the mixing tower 13 of the second stage of the apparatus 10 via a sampling coupling 86 in which is mounted a sample cock 87 for removing a portion of the fluid flowing from the outlet 83 of the tower 12 for testing purposes, a flanged angle L connection 89, a flanged connecting pipe 90, and a flanged angle L connection 92.

Considering now the eductor unit 26 in greater detail with reference to the FIG. 3, the unit 26 pre-mixes the gas from the tank 28 with the caustic from tank 24 and the waste liquid in response to the flow of fluid through the unit 26 so that the toxic gas does not enter the mixing chamber of the tower before pumping the waste fluid into the mixing chamber. For this purpose, the unit 26 includes a valve body portion 94 having a chamber 96 communicating with a gas inlet 98 adapted for connection to the hose 77, and a valve body portion 101 having a chamber 103 communicating with a waste fluid inlet 105 and communicating with an outlet 107. Fluid flow from the waste fluid inlet 105 to the outlet 107 causes a drop in pressure in the chamber 103 to draw a diaphragm 109, separating the chambers 103 and 96, into the chamber 103. Movement of the diaphragm 109 causes a valve member 111 connected thereto to move against the force of a bias spring 113 and out of sealing engagement with a valve seat 115 mounted within the valve body portion 94, whereby the gas under vacuum is drawn into the gas inlet 98, through the chamber 96, a passageway 117 in the valve member 111, the chamber 103, and a series of holes 119 in a pipe 121 connecting the inlet 105 and the outlet 107. Such an eductor unit may be obtained from Capital Controls Co., Inc. of Colmar, Pa.; however, it is to be understood that other types of eductor units may also be successfully employed in accordance with the present invention.

Considering now the mixing tower 12 in greater detail, as shown in FIG. 1, the pair of vertically-spaced impellers 14 and 16 are journalled for rotation on a shaft 123 which is driven by an electric motor 125 mounted on the top of the tower 12. As shown in the drawings, each of the impellers is a turbine-type impeller and is adjustably mounted on the shaft 123 to enable it to be moved to an adjusted position relative to the inlet ports. It is preferred to use an enclosed impeller as illustrated, but other forms of impellers may be used. In this embodiment of the invention, it is preferred to use an impeller having four flat vanes and the rate of pumping of the impellers is preferably greater than the flow of fluid to the mixing chamber.

The lower impeller 14 is spaced slightly above the exit end of an ejector tube 129 of the inlet 79. The waste fluid enters the mixing chamber below the rotating impeller 14 via the inlet 60 to cause a high velocity vortical whirl. The waste liquid under pressure flows upwardly through an opening (not shown) in the bottom wall 130 of the impeller 14 around the shaft 123 and is forced outwardly in a radial direction by the vanes to vortically whirl the liquid under the impeller 14 at a relatively higher velocity than the velocity of the liquid entering the chamber 17. The velocity of the vortically whirling liquid is approximately six times the velocity of the waste liquid entering the chamber 17. The caustic is added to the waste fluid being pumped from the sump 20 before the waste fluid enters the eductor unit 26 which causes the chlorine gas to be added to the caustic-waste fluid mixture. The resulting mixture from the eductor unit 26 is ejected from the tube 129 into the location of the vortical whirl to thoroughly mix the caustic and the chlorine gas with the waste fluid. A portion of the waste-caustic-chloride gas mixture is continuously forced around the impeller 14 in an upward direction within the chamber 17 at a velocity which is substantially the same as the velocity of the waste fluid entering the chamber 17.

The upper impeller 16 vortically whirls the waste-caustic-chlorine gas mixture to form a vortex under the impeller 16. For a more detailed description of the mixing tower 12, reference may be made to the above-mentioned patent application, Ser. No. 463,230, filed June 11, 1965.

Considering now the second stage 29 of the waste treating apparatus 10 in greater detail with particular reference to FIGS. 1 and 2, the mixing tower 13 is similar in construction to the mixing tower 12, except that some of the cyanate bearing fluid from the mixing tower 13 is continuously conveyed by means of the ejector pump 39 to an eductor unit 27 which is coupled to a lower inlet 133 (FIG. 1). An upper outlet 137 is coupled to the inlet of the ejector pump 39 by means of an angle L connection 139 and a pipe 141. The output of the ejector pump 39 is coupled to the eductor unit 27 via the T connection (FIG. 1) and an angle L connection 143 and a hose 145. As mentioned before, the caustic is pumped from the tank 24 by caustic pump 37 (FIG. 1) to the T connection 40. The lower inlet 133 has an ejector tube 147 (FIG. 1) extending into the mixing chamber slightly beneath the lower impeller 33 for ejecting the pre-mixed chlorine-caustic liquid from the unit 27 into the tower 13. In the preferred embodiment of the invention, eductor unit 27 for the mixing tower 13 is identical to the unit 26 for the tower 12 of the first stage.

The treated waste is discharged from the tower 13 into a sanitary or storm sewer via an upper outlet 149, a sight glass 151 for viewing the treated waste, and a hose 153.

Considering now the electrical controls for the waste treating apparatus 10, the electrical controls for starting the motors and sensing devices for the apparatus 10 are housed in the control panel 47. As shown in FIG. 1, a low pressure cut-off device 159 senses the pressure at the output of the sump pump 18 for the purpose of cutting off the power to the motors in the system should the pressure of the waste liquid drop below a certain critical pressure so that the motors are prevented from overworking and the toxic chlorine or sulfur dioxide is prevented from saturating the system. A liquid level alarm device 170 is located in the control panel 47 and senses the presence of a high sump level, indicated in FIG. 1 at 172. In response to a high sump level, the device 170 sounds an alarm and starts the apparatus 10. A liquid level cut-off device 174 is also located in the control panel 47 for responding to a low sump level, indicated at 176. In response to a low sump level, the device 174 shuts off the motors of the apparatus 10.

In view of the foregoing description it may be seen that there is provided in accordance with the present invention an improved waste treating system employing a pre-mixing step of enabling the chlorine gas under pressure to enter a portion of the flowing cyanide bearing liquid, or sulfur dioxide gas into the chromium bearing liquid, in response to the flow of waste fluid from the waste sump through an eductor. Such a pre-mixing step tends to prevent the noxious gas from leaving the mixing chamber before mixing with the waste liquid. Furthermore, such a pre-mixing step tends to more thoroughly mix the gas with the waste liquid.

While the present invention has been described in connection with the particular embodiments thereof, it will be understood that those skilled in the art may make many changes and modifications without departing from the invention. Accordingly, it is intended by the appended claims to cover all such changes and modifications as fall within the true spirit and scope of this invention.

What is claimed is:

1. A method for the in-line treating of waste liquid, comprising
   diverting a portion of the waste liquid from the main line of flow and adding first and second chemical reactants thereto,
   then combining the diverted and undiverted portions of said waste liquid in a first enclosed mixing chamber,
   violently mixing the liquid in said chamber to accelerate the reaction between said waste liquid and said reactants,
   passing the mixed liquid from said first chamber to a second enclosed mixing chamber, and
   violently mixing the liquid in said second chamber with liquid removed downstream thereof and to which additional amounts of said chemical reactants have been added.

2. A method according to claim 1 wherein said first chemical reactant is chlorine gas.

3. A method according to claim 2 wherein said second chemical reactant is an oxidizer.

4. A method according to claim 2 wherein said second chemical reactant is an alkaline solution.

5. Apparatus for treating waste liquids comprising
   means defining a completely enclosed mixing chamber having a plurality of inlets and an outlet,
   motor driven impeller means rotatably mounted on a shaft and disposed within said chamber,
   means for causing said waste liquid to flow through said chamber from one of said inlets to said outlet, and
   means responsive to the flow of waste liquid for feeding a treating gas into said chamber via another of said inlets in the location of said impeller to cause the rapid reacting of said gas with said waste liquid, and for interrupting the feeding of said treating gas in response to interruption in the flowing of said waste liquid.

6. An apparatus according to claim 5, wherein said means responsive to the flowing waste comprises an eductor for mixing said waste fluid with said treating fluid in response to said waste fluid flowing through said eductor.

7. An apparatus according to claim 5, wherein said impeller causes the flowing waste fluid to be vortically whirled and said treating fluid enters the chamber in the location of the vortex to mix with the vortically whirling waste fluid.

8. An apparatus according to claim 7, wherein said means responsive to the flowing waste fluid comprises an eductor for mixing said waste fluid with said treating fluid in response to said waste fluid flowing through said eductor, and further including means for adding a second treating fluid to a portion of said flowing waste fluid and means for feeding the mixture of said second treating fluid and said waste fluid to said eductor so that the first-mentioned treating fluid can be added to the flowing mixture of said treating fluid and said waste fluid.

9. Apparatus for treating waste fluids, comprising
means defining a mixing chamber having a plurality of inlets and an outlet;
motor driven impeller means rotatably mounted on a shaft and disposed within said chamber for causing the flowing waste liquid to be vertically whirled;
means for causing said waste fluid to flow continuously into one of each inlets, through said chamber and out of said outlet,
means responsive to the flowing waste fluid for feeding a treating fluid into said chamber in the location of the vortex to mix with the vortically flowing waste, and for interrupting said feeding of said treating fluid in response to the interruption of the flowing of said waste fluid,
a second means defining a mixing chamber having a plurality of inlets and a plurality of outlets and having a motor-driven impeller rotatably mounted on a shaft and disposed within its chamber, one of said inlets being connected in fluid communication with the outlet of the first-mentioned chamber;
means connected to one of the outlets of the second chamber for conveying a portion of said fluid flowing within said second chamber from said second chamber;
means for adding an additional amount of second treating fluid to said portion of said fluid flowing from said second chamber; and
an eductor for adding an additional amount of said first treating fluid to the mixture of said fluid flowing from said second chamber and said second treating fluid in response to the last-mentioned mixture flowing through said eductor, the outlet of said eductor being connected in fluid communication with another one of said inlets in said second chamber, whereby a portion of said fluid flowing within said second chamber is continuously recirculated and additional amounts of said first and second treating fluids are added to the recirculating fluid.

References Cited

UNITED STATES PATENTS 2,012,406   8/1935   Savell _____ 137—98

FOREIGN PATENTS 759,109   10/1956   Great Britain.
895,740   5/1962    Great Britain.

OTHER REFERENCES

Pinkerton, H. L.: Waste Disposal, Chapter 11 of Electroplating Engineering Handbook, pp. 285 and 294–306 relied on.

MICHAEL E. ROGERS, Primary Examiner

U.S. Cl. X.R.

137—98; 210—61, 62, 101, 199; 261—93